United States Patent
Rodriguez et al.

(10) Patent No.: US 8,926,108 B2
(45) Date of Patent: Jan. 6, 2015

(54) MOTOR AND POINTER JACK ASSEMBLY

(71) Applicant: Continental Automotive Systems, Inc., Auburn Hills, MI (US)

(72) Inventors: Irving Morales Rodriguez, Guadalajara (MX); Anel Ortiz Gonzalez, Zapopan (MX); Manuel Jimenez Barragan, Zapopan (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 39 days.

(21) Appl. No.: 13/714,484

(22) Filed: Dec. 14, 2012

(65) Prior Publication Data

US 2014/0168939 A1  Jun. 19, 2014

(51) Int. Cl.
*G01D 11/28*  (2006.01)
*B60K 35/00*  (2006.01)
*G01D 13/26*  (2006.01)

(52) U.S. Cl.
CPC .............. *B60K 35/00* (2013.01); *G01D 13/265* (2013.01)
USPC .................... 362/23.21; 362/23.07; 362/23.09

(58) Field of Classification Search
USPC ................................. 362/23.09, 23.07, 23.21
See application file for complete search history.

(56) References Cited

U.S. PATENT DOCUMENTS

| | | | | |
|---|---|---|---|---|
| 5,142,453 A | * | 8/1992 | Ohta et al. | 362/29 |
| 5,319,527 A | * | 6/1994 | Murphy et al. | 362/26 |
| 6,120,158 A | * | 9/2000 | Ishimaru et al. | 362/26 |
| 6,189,480 B1 | * | 2/2001 | Staley et al. | 116/288 |
| 6,314,908 B1 | * | 11/2001 | Olbrich et al. | 116/288 |
| 6,820,991 B2 | * | 11/2004 | Wakaki et al. | 362/27 |
| 6,863,411 B2 | * | 3/2005 | Furuya | 362/23 |
| 7,191,730 B2 | * | 3/2007 | Araki et al. | 116/288 |
| 7,373,898 B1 | * | 5/2008 | Tenka | 116/328 |
| 7,724,129 B2 | * | 5/2010 | Altomonte | 340/461 |

* cited by examiner

*Primary Examiner* — Evan Dzierzynski

(57) ABSTRACT

A pointer with an integrated light emitting diode (LED) designed with the female side of a jack connector. A motor is designed with the male side of the jack connector, replacing the shaft of the motor. The pointer is assembled with the male side of the jack connector integrated in the motor. The pointer is designed as an in-mold, integrated LED and female side of the jack connector. LED terminals are connected to the jack connector. The motor integrates the male side of the jack connector, replacing the shaft of the motor. LED supply voltage signals (VCC,GND) reach the printed circuit board (PCB) through the jack connector by implementing new contact springs in the base of the motor. Inside the motor the shaft is connected to the contact springs with brushes.

15 Claims, 4 Drawing Sheets

MOTOR AND POINTER JACK ASSEMBLY

FIELD OF THE INVENTION

The present invention relates generally to a gauge having a pointer which is integrated with a connector.

BACKGROUND OF THE INVENTION

Instrument clusters in vehicles are generally used to provide an indication of the various operating conditions of the vehicle. An instrument cluster typically consists of several gauges which are used to provide an indication of vehicle speed, operating temperature of the engine, engine speed, fuel level, oil pressure, and the like.

Most instrument clusters have some type of illumination system which is used to illuminate the gauges so they may be seen during nighttime driving conditions. One approach to illuminating a gauge is to provide a needle, or pointer needle which is illuminated by a light emitting diode (LED) mounted on a base to illuminate the pointer needle. Other attempts to illuminate a pointer needle include the use of a light guide with an LED to illuminate the pointer needle. Other designs include a pointer needle which includes a portion formed with an acrylic material which is used to reflect or distribute the light received from the LED.

However, if there are any irregularities in the reflective surface of the pointer needle, this could lead to an uneven distribution of lighting for the pointer.

Accordingly, there exists a need for gauge which overcomes the aforementioned drawbacks.

SUMMARY OF THE INVENTION

The present invention is a pointer with an integrated light emitting diode (LED) designed with the female side of a jack connector. A motor is designed with the male side of the jack connector, replacing the shaft of the motor. The pointer is assembled with the male side of the jack connector integrated in the motor.

The pointer is designed as an in-mold, integrated LED and female side of the jack connector. LED terminals are connected to the jack connector. The motor integrates the male side of the jack connector, replacing the shaft of the motor. LED supply voltage signals (VCC,GND) reach the printed circuit board (PCB) through the jack connector by implementing new contact springs in the base of the motor. Inside the motor, the shaft is connected to the contact springs with brushes.

The supply voltage for the pointer LED is connected through the jack connector down to the motor base, the LED driving circuit can be implemented on the same PCB that the motor is mounted on, providing a robust pointer assembly. No additional PCB is required, and no prism in the pointer is required to reflect the light from any LEDs mounted to the PCB (no LEDs mounted to the PCB are needed). Illumination is direct from the integrated LED, therefore, providing complete illumination of the pointer.

In one embodiment, the present invention is a gauge having a pointer integrated with a jack which includes a connector having a cylindrical portion and a shaft, a needle integrally formed as part of the cylindrical portion of the connector, an aperture formed as part of the cylindrical portion of the connector, and a cavity formed as part of the needle. At least one light source is disposed within the cavity, and the shaft is partially disposed in the aperture when the cylindrical portion is connected to the shaft.

A first terminal and a second terminal are connected to the light source, and the first terminal and the second terminal are integrally formed with the cylindrical portion of the connector.

The present invention also includes a stepper motor, where the shaft is part of the stepper motor, and a PCB connected to the stepper motor. A positive terminal and a negative terminal are connected to the PCB. The negative terminal of the PCB is in electrical communication with the first terminal of the at least one light source, and the positive terminal of the PCB is in electrical communication with the second terminal of the at least one light source.

In one embodiment, the light source is an LED. In alternate embodiments, LEDs are placed on the PCB to illuminate the pointer, where the pointer includes a prism that reflects the light to the pointer body.

One of the advantages of invention includes complete illumination of the pointer using the LED. The LED is energized directly from the jack connector of the motor. No additional connections required in the pointer area. Additionally, no spaced on the PCB is needed for the placement of LEDs.

Furthermore, assembly of the pointer becomes simplified and robust by plugging the jack connector. In alternate embodiments, thinner pointers may be used, which are illuminated by the LED.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
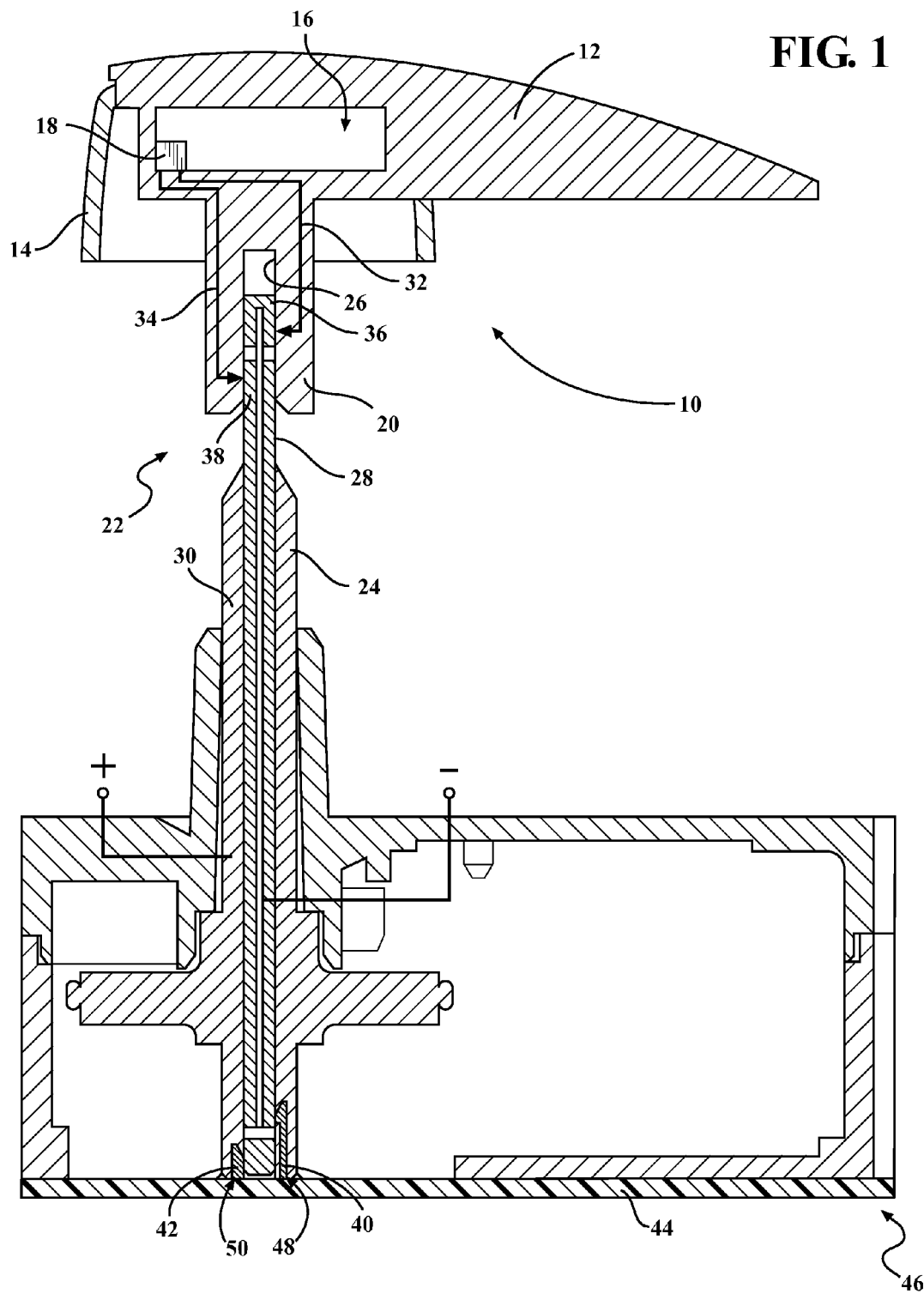
FIG. 1 is a sectional view of a motor and pointer jack, according to embodiments of the present invention.

The following description of the preferred embodiment(s) is merely exemplary in nature and is in no way intended to limit the invention, its application, or uses.

Referring now to the Figures generally, a gauge having pointer needle integrated with a jack, or connector, is shown generally at 10. The gauge 10 includes a needle 12 having a cap portion 14. The needle 12 also includes a cavity, shown generally at 16. Disposed within the cavity 16 is a lighting element 18, which in this embodiment is a light emitting diode (LED). However, it is within the scope of the invention that other types of lighting elements may be used.

Integrally formed with the needle 12 is the first portion 20 of a connector, generally shown at 22. The connector 22 also includes a second portion 24, received into the first portion 20. More specifically, the first portion 20 has a substantially cylindrical shape to form a cylindrical portion, and includes an aperture 26. The second portion 24 is also substantially cylindrical in shape such that the second portion 24 forms a shaft, and includes a small diameter portion 28 and a large diameter portion 30. The small diameter portion 28 is partially received into the aperture 26, as shown in FIG. 2.

Connected to the LED 18 is a first terminal 32 and a second terminal 34. When the cylindrical portion 20 is connected to the small diameter portion 28 of the shaft 24, the first terminal 32 is also connected to an end portion 36 of the small diameter portion 28, providing an electrical connection between the first terminal 32 and the negative terminal 40 of a printed circuit board (PCB) 44. The second terminal 34 is also connected to another end portion 38 of the small diameter portion 28, providing a connection between the second terminal 34 and the positive terminal 42 of the PCB 44. In this embodiment, the terminals 40,42 are brushes, the brushes 40,42 are connected to contact springs, and the contact springs are connected to areas on the PCB 44, generally shown as a first area 48 and a second area 50. These areas 48,50 are where the contact springs connect to the PADS of the PCB.

Figure 2:
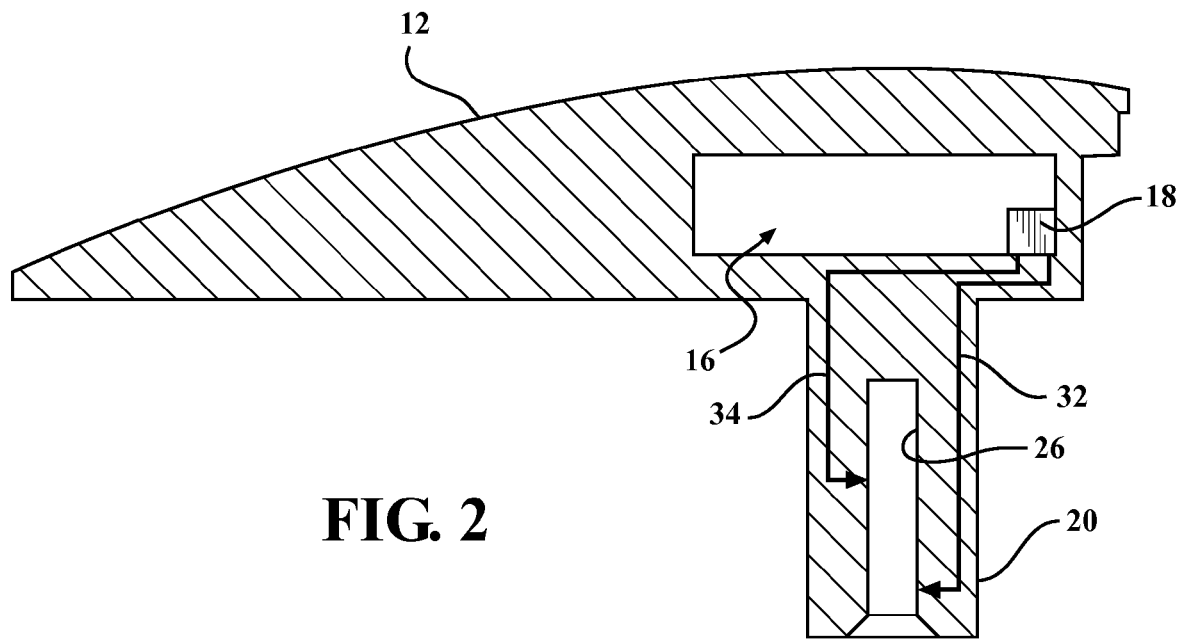
FIG. 2 is a sectional view of a needle and cylindrical portion used as part of a motor and pointer jack, according to embodiments of the present invention.

In the embodiment shown in FIGS. 1-2, the shaft 24, more specifically the large diameter portion 30, is part of an actuator, which in this embodiment is a stepper motor 46. The PCB 44 is connected to the stepper motor 46, as shown in FIG. 1. It is shown in FIG. 1 that the PCB 44 is connected to the stepper motor 46 on the opposite side of the stepper motor 46 compared to the shaft 24.

The PCB 44 is used for controlling the operation of the LED 18. The needle 12 is part of a gauge, and the gauge is part of an instrument cluster. The needle 12 may be used as part of a speedometer, fuel gauge, tachometer, temperature gauge, or any other gauge that may be used as part of an instrument cluster. The LED 18 may be activated during certain driving conditions when it may be difficult to otherwise see the needle 12, such as nighttime driving, during inclement weather, or the like.

Figure 3:
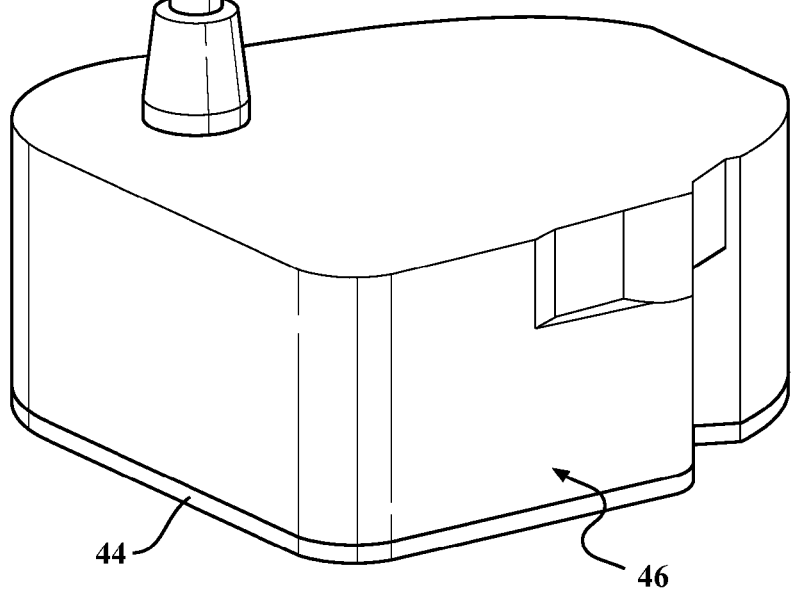
FIG. 3 a perspective view of an alternate embodiment of a motor and pointer jack, with the needle and cylindrical portion removed, according to embodiments of the present invention.
Figure 4:
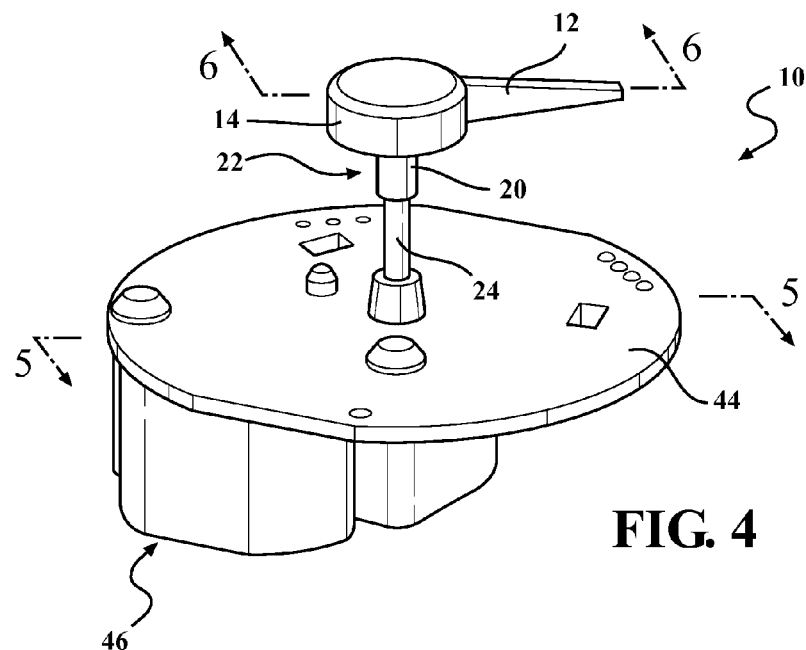
FIG. 4 is a perspective view of an alternate embodiment of a motor and pointer jack, and a printed circuit board, according to embodiments of the present invention.
Figure 5:
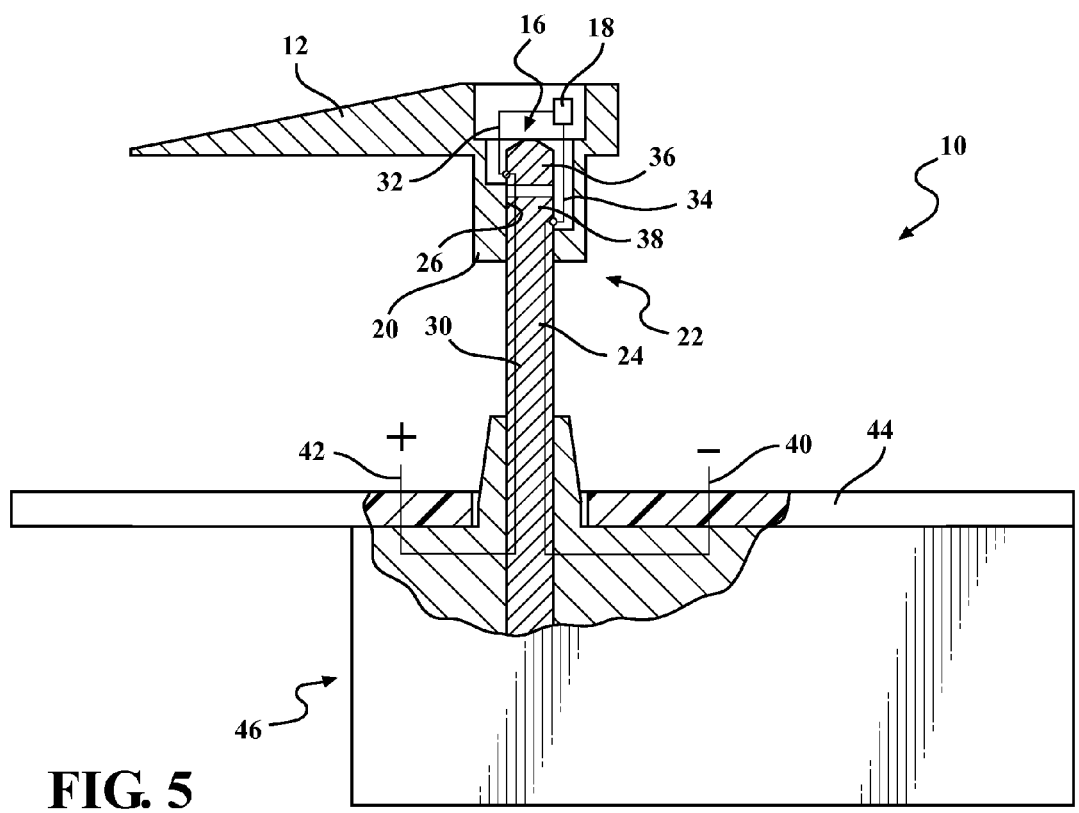
FIG. 5 is a sectional view taken along lines 5-5 of FIG. 4.
Figure 6:
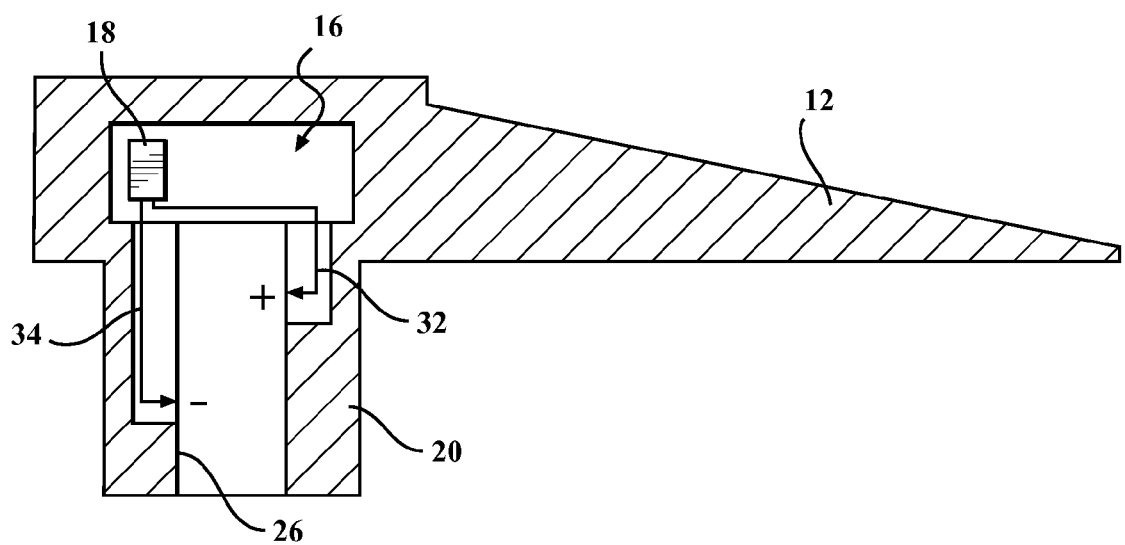
FIG. 6 is a sectional view taken along lines 6-6 of FIG. 4.

An alternate embodiment of the invention is shown in FIGS. 3-6, with like numbers referring to like elements. In this embodiment, the shaft 24 is of a single diameter, and the cylindrical portion 20 includes an aperture 26 which corresponds to the single diameter of the shaft 24, and therefore fits onto the single diameter of the shaft 24, as shown in FIG. 5. The needle 12 includes a cavity 16, as with the previous embodiment, and a lighting element 18 which is disposed within the cavity 16, where the lighting element provides illumination of the needle 12 as desired.

In other alternate embodiments, in addition to the PCB 44 being located on the opposite side of the stepper motor 46 as the shaft 24, as shown in FIGS. 1 and 3, the PCB 44 may be located on the same side of the stepper motor 46 as the shaft 24, as shown in FIGS. 4-5.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus comprising:
    a gauge for a vehicle, including:
    a connector;
    a needle;
    a first portion being part of the connector, the needle integrally formed as part of the first portion of the connector;
    a cavity formed as part of the needle;
    at least one light source located within the cavity, the at least one light source selectively illuminating the needle;
    an actuator for positioning the needle;
    a shaft being part of the connector, the shaft having at least two end portions substantially surrounded by the first portion of the connector, the shaft connected to the actuator;
    a first terminal connected to the at least one light source and one of the end portions of the shaft, the first terminal integrally formed with the first portion of the connector; and
    a second terminal connected to the at least one light source and another of the end portions of the shaft, the second terminal integrally formed with the first portion of the connector;
    wherein the first portion of the connector is connected to the shaft of the connector to connect the needle to the actuator when the gauge is assembled.

2. The apparatus of claim 1, wherein the first portion of the connector is a cylindrical portion having an aperture.

3. The apparatus of claim 2, the shaft further comprising a large diameter portion and a small diameter portion, the small diameter portion at least partially extending into the aperture when the cylindrical portion is connected to the shaft.

4. The apparatus of claim 1, further comprising:
    a negative terminal in electrical communication with the first terminal; and
    a positive terminal in electrical communication with the second terminal;
    wherein the negative terminal and the positive terminal are connected to a printed circuit board.

5. The apparatus of claim 1, the actuator further comprising a stepper motor.

6. The apparatus of claim 1, the at least one light source further comprising a light emitting diode.

7. A gauge having a pointer integrated with a jack, comprising:
    a connector having a cylindrical portion and a shaft having at least two end portions substantially surrounded by the cylindrical portion of the connector;
    a needle integrally formed as part of the cylindrical portion of the connector;
    an aperture formed as part of the cylindrical portion of the connector;
    a cavity formed as part of the needle;
    at least one light source disposed within the cavity;
    a first terminal connected to the at least one light source and one of the end portions of the shaft, the first terminal integrally formed with the cylindrical portion of the connector;
    a second terminal connected to the at least one light source and another of the end portions of the shaft, the second terminal integrally formed with the cylindrical portion of the connector; and
    an actuator connected to the shaft of the connector;
    wherein the shaft is partially disposed in the aperture when the cylindrical portion is connected to the shaft.

8. The gauge having a pointer integrated with a jack of claim 7, the actuator further comprising a stepper motor, the shaft being part of the stepper motor.

9. The gauge having a pointer integrated with a jack of claim 7, further comprising:
    a printed circuit board;

a positive terminal connected to the printed circuit board; and a negative terminal connected to the printed circuit board;

wherein the negative terminal of the printed circuit board is in electrical communication with the first terminal of the at least one light source, and the positive terminal of the printed circuit board is in electrical communication with the second terminal of the at least one light source.

10. The gauge having a pointer integrated with a jack of claim 7, wherein the at least one light source is a light emitting diode.

11. A method for connecting a pointer needle to a motor for a gauge, comprising the steps of:

provide a connector having a cylindrical portion, and a shaft having at least two end portions substantially surrounded by the cylindrical portion of the connector;

providing a pointer needle integrally formed with the cylindrical portion;

providing an actuator;

forming a cavity as part of the pointer needle;

locating at least one light source in the cavity;

providing the at least one light source with a first terminal integrally formed with the cylindrical portion of the connector, the first terminal connected to the at least one light source and one of the end portions of the shaft;

providing the at least one light source with a second terminal integrally formed with the cylindrical portion of the connector, the second terminal connected to the at least one light source and another of the end portions of the shaft; and connecting the pointer needle to the actuator using the cylindrical portion and the shaft.

12. The method for connecting a pointer needle to a motor for a gauge of claim 11, further comprising the steps of:

providing an aperture formed as part of the cylindrical portion; and placing at least a portion of the shaft into the aperture to connect the cylindrical portion to the shaft.

13. The method for connecting a pointer needle to a motor for a gauge of claim 11, further comprising the steps of:

providing a printed circuit board;

providing a positive terminal connected to the printed circuit board;

providing a negative terminal connected to the printed circuit board; and connecting the negative terminal of the printed circuit board with the first terminal of the at least one light source;

connecting the positive terminal of the printed circuit board with the second terminal of the at least one light source;

controlling the operation of the at least one light source with the printed circuit board.

14. The method for connecting a pointer needle to a motor for a gauge of claim 11, further comprising the steps of:

providing the actuator to be a stepper motor having the shaft; and controlling the movement of the pointer needle with the stepper motor.

15. The method for connecting a pointer needle to a motor for a gauge of claim 11, further comprising the steps of providing the at least one light source to be a light emitting diode.

* * * * *